Sept. 6, 1966 E. E. GOODRICH ETAL 3,270,918
HOT BEVERAGE DISPENSER
Filed Dec. 26, 1963 3 Sheets-Sheet 1

INVENTORS.
EUGENE E. GOODRICH
PAUL J. DANIELS
GLEN A. BURCH
MICHAEL R. WILKINSON

ATT'Y.

Sept. 6, 1966  E. E. GOODRICH ET AL  3,270,918

HOT BEVERAGE DISPENSER

Filed Dec. 26, 1963  3 Sheets-Sheet 2

INVENTORS.
EUGENE E. GOODRICH
PAUL J. DANIELS
GLEN A. BURCH
MICHAEL R. WILKINSON

BY
Watson D. Harbaugh
ATT'Y.

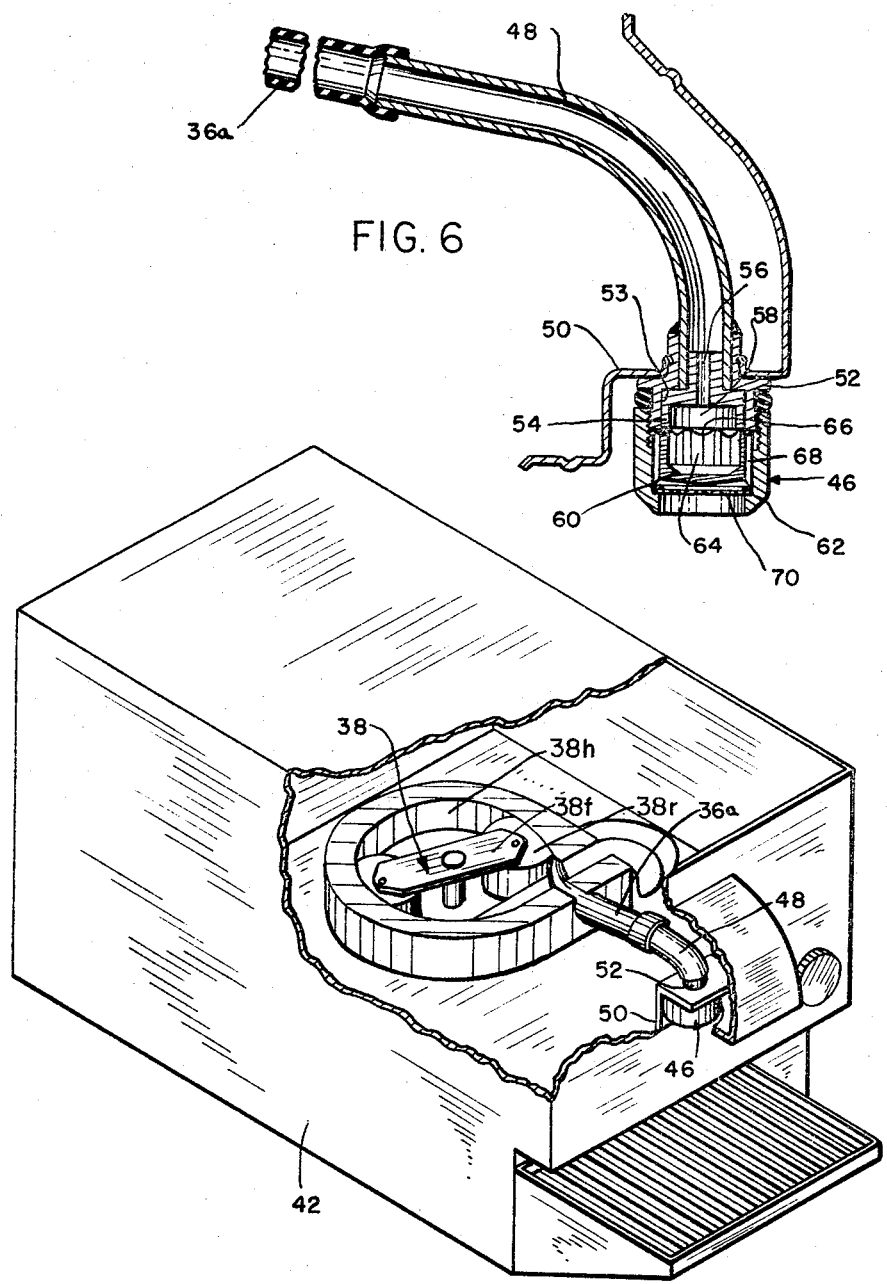

United States Patent Office 3,270,918
Patented Sept. 6, 1966

3,270,918
HOT BEVERAGE DISPENSER
Eugene E. Goodrich, Park Ridge, Ill., Paul J. Daniels, Sarasota, Fla., Glen A. Burch, Niles, Mich., and Michael R. Wilkinson, South Bend, Ind., assignors, by mesne assignments, to The Bastian Blessing Company, Chicago, Ill., a corporation of Illinois
Filed Dec. 26, 1963, Ser. No. 333,610
12 Claims. (Cl. 222—64)

The present invention relates to beverage dispensers and more particularly to an apparatus for the making and dispensing of hot drinks including coffee and tea.

Many beverage dispensers, such as coffee makers and urns, as shown in Levings Patent No. 1,882,247 provide an outer jacket which is adapted to be filled with hot water. The hot water serves a multiple purpose of keeping the coffee in the inner container hot, a little below boiling temperatures, and provides a reservoir of hot water for further immediate brewing of coffee preferably by the drip method. In some installations the hot water additionally may be dispensed directly for tea.

Heretofore, and generally speaking, the hot water, when used for brewing coffee, is transferred from the outer jacket in either one of two ways. It is either drawn off by gravity into a measuring vessel and manually poured into the inner container, or the outer jacket is sealed and pressure is utilized through complex valving arrangements requiring constant attention to effect transfer of the hot water into the inner container. The pressure is generally supplied by steam.

Many difficulties and dangers were involved that are solved by the present invention. With the draw, lift and pour operation, the urn location involves the handling of a pan of scalding water in one's hands for pouring either above one's head or from a stool. The pressure-type system involves extra expense of the sealing of the outer jacket and of the necessary plumbing fixtures. Both systems are low on safety as well as requiring personal attention and neither provides an accuracy of measurement of the hot water desired in making coffee properly.

Moreover, conventional coffee urns are located on counter tops for easy manipulation and dispense by gravity through a spigot located near or at the bottom of the urn. Valuable counter space is thereby preempted for what amounts to bulk drink storage whether it be on a front or back counter. If located on the front counter, it obstructs full view and service, and if on a back counter, the operator must turn around for each cup.

In either location cleaning of the urns usually becomes a chore involving lifting and pouring on stools or step ladders under unsafe conditions.

The present invention relates to beverage dispensers and by way of description and not of limitation, a dispenser for hot coffee is shown wherein metering lifts are utilized to transfer hot water to the brewing chamber and to transfer both hot water and brewed coffee from the urn to a small space saving dispensing head or station on the front counter for direct service by and to the consumer with a smooth and even flow of liquid.

The operation of the dispenser is fully automatic, requiring only the removal of the coffee grounds at the end of each brewing cycle. The water supply is accurately determined as well as the temperature thereof and the coffee made therewith. Moreover, the water is replenished and brought to and maintained automatically at a predetermined temperature and level.

A further object of the invention is to provide a drink dispenser which can be mainly located beneath the counter thereby clearing valuable counter space for other items for direct sale to the customer. Also the invention provides for ready cleaning, maintenance and servicing remotely from the counter of roll-in and roll-away equipment which saves labor and provides a high degree of safety. The invention is further characterized in not only lifting coffee by power against gravity as needed to a convenient dispensing height, but in also metering and dispensing the coffee under sanitary conditions right to the cup without contact with outside air except at the purchaser's cup in strict compliance with all codes governing the dispensing of non-cooled potable liquids.

Devices embodying the invention are also free of any pressure changes and gravity effects and provide a constant rate metered delivery for rapid repetitive servings with or without cream or other ingredients present in the cup to be mixed therewith if desired.

A further object of the invention is to provide a hot beverage dispenser which utilizes dispensable food-contacting flexible conduits, unaffected by heat, which can be periodically replaced for excellent sanitation at an expense less than that of cleaning.

Yet another object of this invention is to provide a dispenser which is economical to manufacture, simple in operation with a minimum of parts needing maintenance, and designed to meet the high sanitary standards required in the food dispensing trade.

There being among the objects of the invention other and further objects which will become apparent from the appended claims and the description relating to the drawings herein where:

FIG. 5 is a perspective view, partly in section of the dispensing head located on top of the counter, and FIG. 6 is an enlarged vertical sectional view of the dispensing nozzle of the device embodying the invention.

Figure 1:
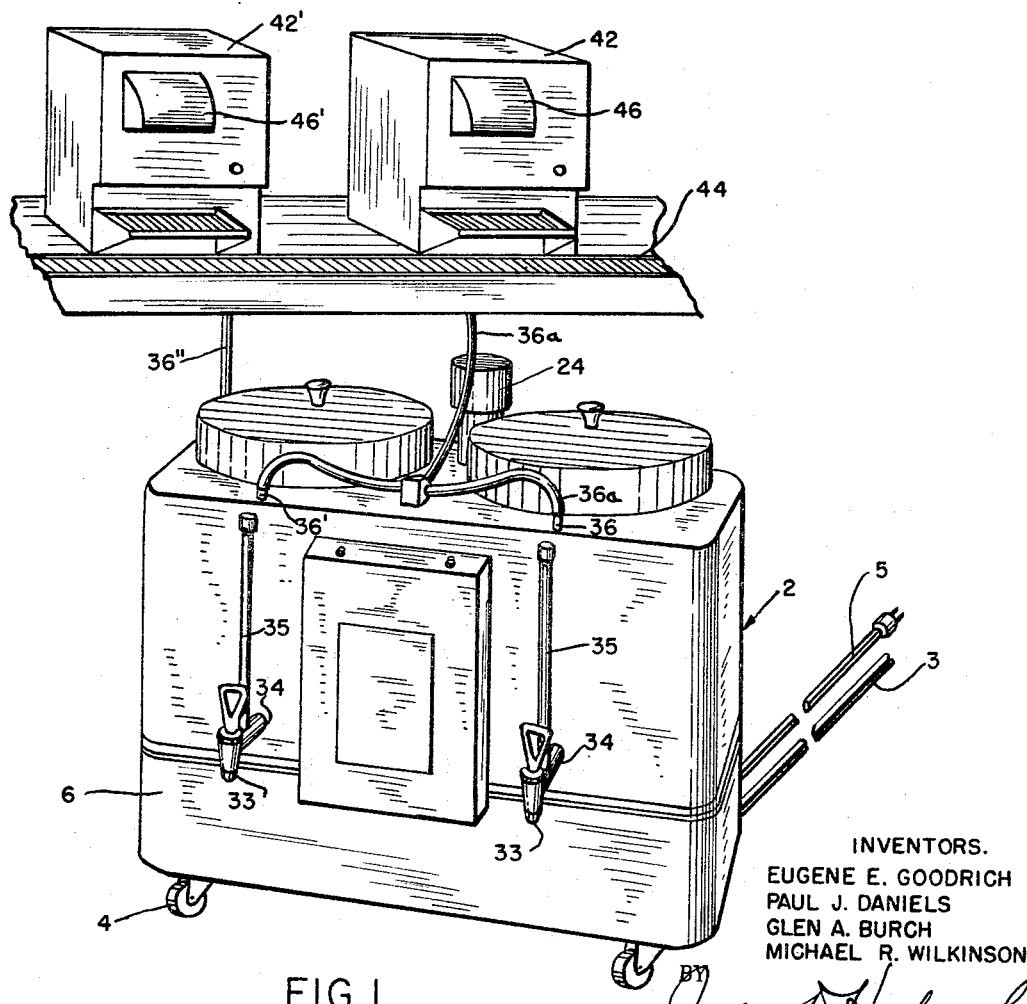
FIG. 1 is a perspective view from in front of a front counter in a cafeteria with the front wall thereof cut away to show a wheeled coffee urn turned with the working side available for viewing.
Figures 2, 3:
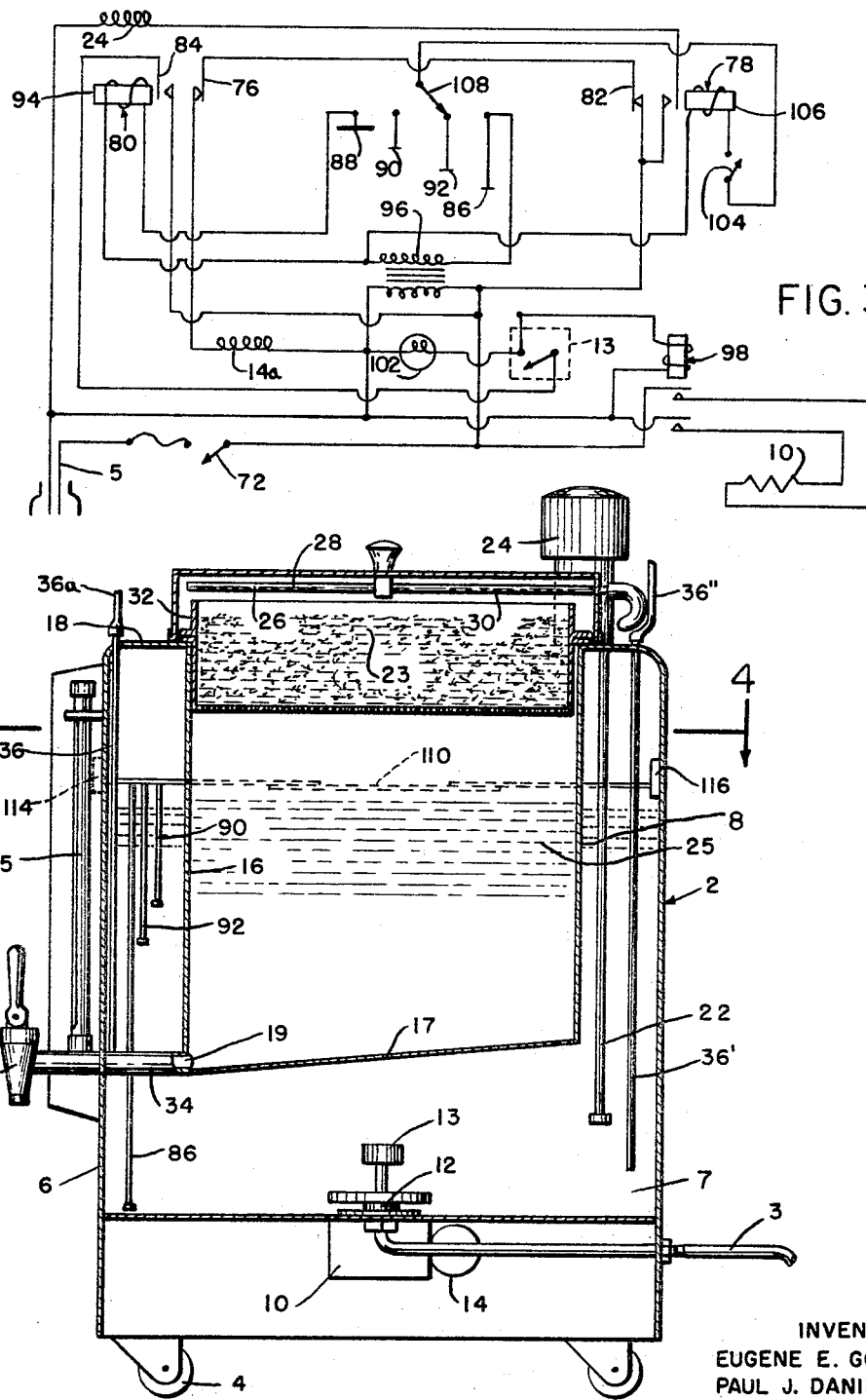
FIG. 2 is a side elevational view, partly in section, of the wheeled coffee urn portion of the invention shown in FIG. 1.
FIG. 3 is a schematic wiring diagram of the circuit embodied for controlling the operation of the brewing and dispensing of coffee.

In FIGS. 1 and 2 a coffee brewer is generally indicated at 2. The brewer can be provided as a stationary device but preferably is provided with casters 4, a water connection hose 3 and electrical extension cord 5 so that it may be readily moved at floor level. Thus it can be disconnected and rolled to a place convenient for major cleaning and can be shifted for keeping its immediate environment clean. As will be noted later, the dispensing conduits are also flexible. Thus, all conduits connecting the urn to stationary elements are flexible to permit mobility.

A housing 6 encloses a water jacket 8 around which reserve water 7 is heated and stored. The water can be dispensed directly cup by cup for the brewing of hot tea or in measured bulk amounts in the brewing of hot coffee. For these purposes a high wattage heater element 10 is centrally disposed in the bottom of jacket 8 preferably in the path of cold replenishing water entering through a water inlet port 12 as controlled by solenoid valve 14. The entrance and heating of the water are controlled by an electrical circuit later to be described with a thermostat 13 located advantageously in the coolest part of the jacket.

Two cylindrical urns 16 are supported in the top wall 18 of the housing 6 and depend into jacket 8 in heat exchange relationship with the water therein. It is to be noted that the bottoms 17 of urns 16 above the bottom of jacket 8 are inclined towards the outlet openings 19 thus allowing the liquid in jacket 8 to contact both the sides and the bottom of each urn and thereby impart heat to the urns and their contents.

An eduction tube 22 (FIG. 2) at the bottom of jacket 8 is affixed to the inlet of a pump 24 located on the top wall 18 and is connected to spray water over the bed of ground coffee for percolation therethrough in each urn selectively.

Spray appartus 28 comprises radiating pipes 26 having small spray openings 30 regularly spaced over the entire coffee bed 23. A coffee holder 32 is removably supported by conventional means and is finely perforated on its bottom to admit the brew to the urns 16.

The brewed coffee 25 is preferably dispensed through a conduit 34 which communicates with a manual dispensing valve 33, a liquid level sight gauge 35 and a delivery conduit 36 (FIG. 2). The conduit 36 includes a resilient wall hose conduit portion 36a extending through and forming a part of a lift 38, shown in FIG. 5. It will be appreciated that the lift 38 can be located either at the inlet end or adjacent the outlet end of the conduit 36. The hose portion 36a comprises a flexible tubing preferably that which is referred to in the medical profession as standard surgical, pure gum rubber tubing and has a 5/16" inside diameter (I.D.) and 1/16" wall thickness. The hose 36a interconnects all rigid portions of the conduit 34.

The lift 38 is shown as located near the outlet end of the conduit 36 in a housing 42 mounted on a serving counter 44. This location allows the small dispensing end portion of the conduit 36 to be a fixed part of restaurant fixtures where exposure of coffee to air is under the most sanitary conditions yet the coffee brewer 2 can be rolled in and out beneath its counter top for servicing and cleaning. The lift or pump 38 acts to progressively squeeze portions of the flexible bore 36a to effect movement of the coffee through the tubing as more particularly described in the Daniels Patent No. 2,909,125. Essentially rotation of the frame 38f bodily carries the rollers 38r around inside the housing 38h in rolling contact with tube 38a therein and progressively squeezes the tube to drive liquid trapped ahead of the squeeze point in the direction of the dispensing nozzle.

Hot water for the brewing of tea or other beverages may additionally be dispensed through utilization of similar liquid eduction conduits and lifts in which conduit 36' and tubing 36" lead to and include a pump or lift 38' located in another lift housing 42' next to the coffee lift housing 42.

It is to be noted that the flexible tubes 36a and 36" are readily removable and replaceable thereby rendering to the system a high degree of sanitation and low maintenance cost in cleaning. They can be replaced for less than the cost of dismantling, cleaning and reassembling them. A "Y" connection for the tubes 36a enable selection of which urn is the dispensing urn with the other acting as a stand-by.

FIGS. 5 and 6 show a discharge nozzle assembly 46 in housing 42 at the outlet of each of the conduits 36 and 36'. The purpose of the nozzle assembly is to insure delivery of a smooth, non-pulsing, even flow of liquid into the consumer's cup. Possible pulsating delivery of hot coffee or hot water with resulting splashing of the contents on the counter and the consumer's hands is thereby eliminated.

The nozzle assembly 46 includes a curved tube 48 swivelly mounted to a bracket 50 with its outlet end directed downwardly for discharge into a customer's cup (not shown). Tube 48 has an enlarged end fitting 52 defining a cylindrical cavity 53 into which is fitted a cup-shaped insert 54 having an orifice 56 and a chamber 58.

At this point it is well to note that the heat of the liquid flowing through the soft rubber tubing 36 or 36' may cause the rubber to lose some resiliency under the rapid compression exerted by the lift rollers and pulsations may occur due to the pump or lift employed. However, the back pressure created by orifice 56 causes the soft rubber walls of the tubing to yield and contract radially. This "breathing" of the tubing acts as a cushioning means for the pulsations by converting them into a fast flowing substantially constant stream as the hot liquid leaves the orifice. The liquid then enters chamber 58 having a cross-sectional flow area substantially greater than that of the tube 36a under resting conditions. There the stream is spread by a redirecting member 60 contained in a nozzle 62 which is threaded to end portion 52. The flow redirecting member 60 has an internal bore 64 of approximately the same diameter as chamber 58 and forms an extension of that chamber. A series of radial notches 66 in the top of the wall of the member 60 communicate with corresponding channels 68 circumferentially spaced about the outer wall of the member 60. Their composite flow area is equal to or a little greater than that of chamber 58. The liquid thereby passes out of chamber 58 and bore 64 through grooves 66 and down channels 68 at a greatly reduced rate of lineal flow.

This series of grooves and channels acts as numerous ports to divide the liquid into separate slow moving streams and screen assembly 70 in nozzle 62 below the channels re-classifies the flow into many slow fine streams over a very large flow area to simulate a "poured" effect for the hot liquid as it enters the customer's cup. The screen assembly 70 may be composed of a fine screen which due to the greater number of holes present sufficiently breaks up the stream of liquid, or preferably may be a series of coarse screens which will insure the same result without trapping fine coffee grounds that might cause a restriction of flow.

Now referring to FIG. 3, an electrical system is shown which is used to control the flow of water to and from jacket 8 and to keep the water therein and in the urns 16 at predetermined temperatures.

Current from a power source flows through main switch 72, contact 82 of relay 78 and contacts 76 of relay 80 to the solenoid coil 14a of solenoid valve 14. The activation of solenoid valve 14 allows water from the water hose 3 to fill jacket 8 to a predetermined level. The water upon rising to the predetermined level contacts electrodes 86 and 88 completing the circuit between isolation transformer 96 and solenoid 94 of relay 80. The contacts 76 are separated by activation of relay 80 de-energizing solenoid valve 14. Contacts 84 now closed allow heavy current relay 98 to close completing the circuit to heating element 10 which acts to heat the water quickly to a temperature determined by the setting of thermostat 13. This is close to but below the boiling point of the water. A small indicating light 102 shows the operator whether the thermostat is opened or closed. The light as shown will go off when the desired temperature is reached.

Once heated, the hot water may be removed from the jacket 8 and sprayed into the urn to brew coffee. This is accomplished electrically through manual activation of switch 104. A circuit is then completed between either of electrodes 90 or 92 and relay 78's solenoid 106, thus activating relay 78 and starting pump 24 to draw hot water through inlet 22.

The amount of water which will be sprayed into the urn is controlled by the vertical positioning of electrodes 90 and 92 within jacket 8 with respect to electrode 86 which is in circuit with the secondary of transformer 96, switch 104 and solenoid 78 which closes the pump 24 circuit. With switch 108 as shown in FIG. 3, the pump motor 24 is deenergized when the water level breaks contact with electrode 92. In the described construction electrode 92 is located so as to allow 5 gallons of water to pass through pump 24 before the water loses contact with electrode 92 causing shut-off of the pump. Electrode 90 is located at a higher position relative to electrode 92 so as to allow three gallons of water to be transferred. Switch 108 allows the operator to select either of the two electrodes depending upon the amount of coffee he desires to brew and while the pump 24 is activated by solenoid 78, the valve 14 is deactivated while the switch 82 is open by energized solenoid 78.

Electrodes 86 and 88 are further utilized, after initial fill of jacket 8, to maintain the water level against water loss due to evaporation or direct dispensing of hot water through conduit 34' as previously described. However, in this function it can be seen that any inadvertent loss of contact between the water and upper electrode 88 will result in a rapid overfilling of jacket 8. Then due to the fixed positions of electrodes 90 and 92 relative to electrode 88 a greater amount of water will be sprayed into the urn than either the 3 gallon or 5 gallon settings contemplate. The resulting brew may be diluted and/or spillage may occur.

Figure 4:
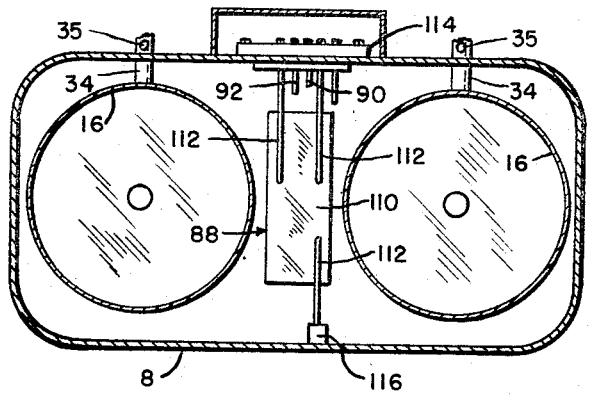
FIG. 4 is a sectional plan view taken on line 4—4 in FIG. 3.

Motion of the water occurring due to mobility or jostling of the brewer 2 creates wave action which assumes proportional distances between peaks on account of the resonance effect when the waves rebound off the walls of jacket 8. Urns 16 provide sufficient baffling against such wave action occurring along the axis of the length of jacket 8 but do not provide such protection for motion across the width. For these reasons electrode 88 is constructed as a large flat plate 110 centrally positioned across the width of jacket 8 between the urns 16 as best shown in FIG. 4. Plate 110 is secured to the walls of jacket 8 by supporting members 112 which are fastened to the plate and insulated blocks 114 and 116 on the front and back wall respectively of jacket 8. Plate 110 is preferably about 2½" in width. Its length is determined by the width of jacket 8, it being found that a length greater than half of the width of jacket 8 will always be longer than the distance between adjoining peaks of the waves thus insuring continuous contact between the water and electrode 88 protecting against overfilling. The possibility of overfilling jacket 8 is therefore greatly minimized if not eliminated.

From the foregoing description it will be apparent that the present invention incorporates many advantageous features of a useful nature. It will be observed that some of the features are adaptable to various modifications and changes and to other uses. All such modifications and changes as are within the scope of the hereunto appended claims are deemed to be a part of this invention.

What is claimed is:

1. In a fluid dispensing device the combination of a first container for a reserve supply of water, means for heating the water, a second container for a beverage disposed within said first container in heat exchange relationship with the water therein, means for transferring a predetermined amount of water to the second container from the first container including a liquid pump and vertically spaced water level responsive elements in the first container, circuit means connected to the upper element controlling the level of said water in the first container and the lower element stopping said pump, lift means for dispensing hot beverage from the second container above the level thereof including a flexible wall tube including means for progressively collapsing the tube successively along a portion of its length, and a liquid flow restricting means at the outlet of said tube.

2. In a beverage dispenser having a mobile housing adapted to contain liquid and container means within said housing for the preparation, storage and dispensing of potable liquids, the combination of means for controlling the movement of replenishing liquid into said housing, transfer means to withdraw liquid from said container means to a dispensing station, control means for metering the flow of liquid from said housing to said container means, said control means including electrodes disposed in said housing in intermittent contact with said liquid at two spaced levels, the upper of said electrodes controlling the first mentioned means to maintain a predetermined level of liquid in said housing and the lower of said electrodes terminating operation of said transfer means, at least one of said electrodes being of an area configuration and located midway between the sides of the housing so as to remain in wave crest bridging contact with the surface of said liquid when said liquid is in oscillatory motion due to movement of said housing.

3. A hot beverage dispenser for counters having a space under them comprising a mobile container received in said space for storing a body of water at atmospheric pressure, means for heating said water, means for maintaining said body of water at a predetermined level, a beverage container in said mobile container disposed in heat exchange relationship therewith, pump means for transferring water from said mobile container to the beverage container, water level responsive means controlling the operation of the pump means to remove same from operation when a predetermined depletion level in said mobile container is reached, and means for dispensing liquid from both containers selectively including a dispensing station housing on the counter, a flexible wall tube interconnecting one of said containers and said housing, lift pump elements in said housing for propelling liquid through said tube and a dispensing nozzle at said station for receiving said propelled liquid.

4. The combination called for in claim 3 in which said dispensing nozzle is a depending one at said station and includes a liquid flow restricting orifice causing said flexible wall to expand under peak pressures induced in said tube by said lift elements, a flow chamber beyond said orifice of a flow area exceeding that of the tube, and flow comminuting ports at the outlet of said chamber reducing the discharge speed below the flow speed in said tube.

5. A beverage dispenser having a container for the storage of liquid below a counter and having transfer means for lifting a hot beverage liquid against gravity from said container to a dispensing station located above said counter at a point higher than said container, said transfer means including a tube having resilient walls which act to pulsate the flow of said liquid at said station, and means at said station for controlling the rate of flow to control said pulsation.

6. A liquid dispenser having a mobile housing for the storage of a measured amount of liquids therein, container means within said housing and in heat-transferring relationship with said liquid in said housing, means to control the flow of liquid into said housing, including electrode means disposed in said housing, said control means acting to arrest the flow of liquid into said housing while said liquid is in contact with said electrode means, said electrode means including an upper liquid level limiting electrode having a contact area of a length greater than the distance between crests of waves induced by movement of the mobile container, and disposed in the center of the housing to contact said liquid at a plurality of locations on the irregular surface of said liquid.

7. A hot beverage liquid dispensing system having a reservoir for the storage of liquid, means for lifting said liquid from said reservoir to a dispensing means, said dispensing means including tube means and a chamber with an orifice therebetween, said tube means having a resilient wall portion which expands at peak pressures and heat of the liquid, said chamber being in communication with said tube through said orifice and having a larger cross-sectional area than said tube, means within said chamber to divide the flow of liquid into separate streams which converge in an eduction portion, said dispensing means acting to smooth out any pulsations in flow of liquid from said reservoir.

8. In a fluid dispensing device, the combination of a mobile housing having a body of liquid therein, beverage container means disposed within said housing in heat-transferring contact with said body of liquid, means for transferring a predetermined amount of liquid from said housing to said container means including a pump and a liquid level responsive means in said body of liquid for stopping the pump, a liquid filler valve for said body of liquid, first circuit means controlling said filler valve including an electrode element having a planar surface disposed in a horizontal plane above said liquid level responsive means to be contacted by the crests of waves present in the surface of said body of liquid for closing said valve when said liquid contact is present to maintain a predetermined fill limit for said body of liquid, second circuit means controlling said pump for dispensing liquid from said body in said housing to said container including a switch in said first circuit means deactivating it while said second circuit means is activated.

9. A hot beverage dispenser comprising a mobile container for storing a body of water at atmospheric pressure below counter top level, means for heating said water, means for maintaining said body of water at a predetermined level in the container, a beverage container in said mobile container disposed in heat exchange relationship therewith, pump means for transferring water from said mobile container to the beverage container, control means for activating said pump means and removing said level maintaining means from operation, water level responsive means controlling the operation of the pump means for determining the amount of water transferred and to remove same from operation when a predetermined depletion level is reached, and means for dispensing liquid from both containers selectively including a flexible wall tube, lift means for propelling liquid through said tube, and a nozzle connected to said tube for receiving and dispensing said propelled liquid at a station above counter top level.

10. A hot beverage dispenser comprising a mobile container for storing a body of water at atmospheric pressure below counter top level, means for heating said water, a horizontal electrode plate of a length greater than the distance between crests of waves induced by movement of the mobile container for maintaining said body of water at a predetermined level in the container, a beverage container in said mobile container disposed in heat exchange relationship therewith, pump means for transferring water from said mobile container to the beverage container, control means for activating said pump means and removing said level maintaining means from operation, water level responsive means controlling the operation of the pump means for determining the amount of water transferred and to remove same from operation when a predetermined depletion level is reached, and means for dispensing liquid from both containers selectively including a flexible wall tube, lift means for propelling liquid through said tube, and a nozzle connected to said tube for receiving and dispensing said propelled liquid at a station above counter top level.

11. The combination called for in claim 10 in which said dispensing nozzle includes a liquid flow restricting orifice causing said flexible wall to expand under peak pressures induced in said tube by said lift elements, a flow chamber beyond said orifice of a flow area exceeding that of the tube, and flow comminuting ports at the outlet of said chamber reducing the discharge speed below the flow speed in said tube.

12. The combination called for in claim 11 in which said flexible wall tube comprises standard surgical pure gum rubber tubing with a portion thereof disposed in a circular coil and said lift elements include spaced rollers rolling around in said coil compressing the tube progressively in the direction of desired flow of liquid through the tube.

References Cited by the Examiner
UNITED STATES PATENTS

| | | | |
|---|---|---|---|
| 1,394,643 | 10/1921 | Reichart | 137—392 |
| 2,706,444 | 4/1955 | Chaplik | 99—291 X |
| 2,753,953 | 7/1956 | Tear | 239—552 |
| 2,909,125 | 10/1959 | Daniels | 103—149 |
| 3,211,338 | 10/1965 | Weil et al. | 222—146 X |

ROBERT B. REEVES, *Primary Examiner.*

LOUIS J. DEMBO, RAPHAEL M. LUPO, *Examiners.*

F. R. HANDREN, H. S. LANE, *Assistant Examiners.*